Patented June 4, 1935

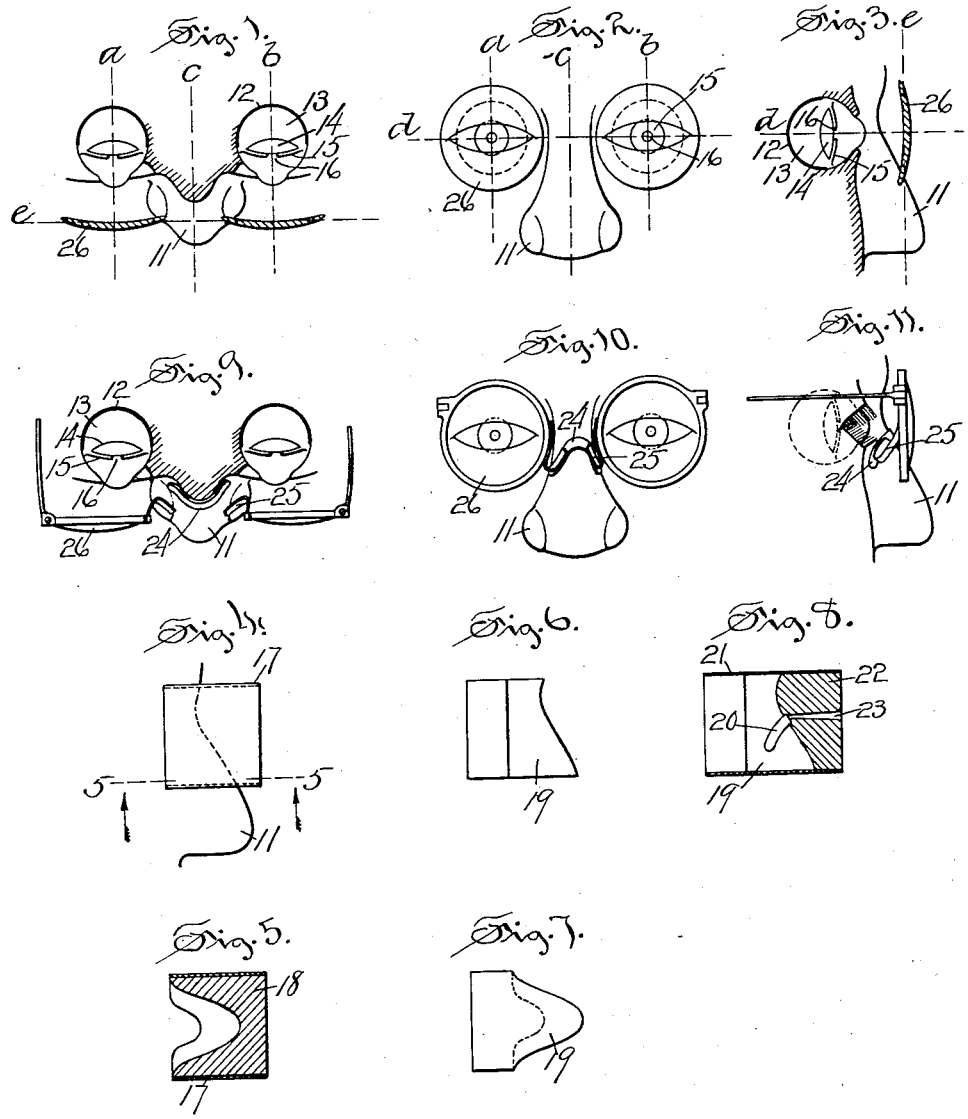

2,003,846

UNITED STATES PATENT OFFICE 2,003,846

METHOD OF FORMING SPECTACLE FRAMES

Arthur J. Wolff, Hartford, Conn.

Application March 17, 1933, Serial No. 661,219

4 Claims. (Cl. 88—43)

My invention relates to that class of devices comprising lenses which are located in the line of sight and which are supported on the nose as an aid to vision, and an object of my invention, among others, is the novel process of conforming the bridge of a spectacle frame to the nose of a person so that the correct position of the lenses with respect to the eyes will always be assured.

A manner of construction of my improved spectacles, in the practice of which said spectacles are produced, and the objects herein set out, as well as others, may be attained is illustrated in the accompanying drawing, in which—

Figure 1 is a view illustrating incompletely and grossly the human eye and nose on a plane in horizontal section passing substantially centrally through the eye structure.

Figure 2 is a similar view but illustrating in front elevation the correct position of the spectacles and eye glasses with respect to the eyes.

Figure 3 is another similar view but on a sectional plane passing vertically through the center of the right eye.

Figure 4 is an illustrative view showing a step in the process of producing my improved spectacles.

Figure 5 is a view in section on a plane denoted by the dotted line 5—5 of Figure 4.

Figure 6 is a view in side elevation of a form produced from the cast shown in Figures 4 and 5.

Figure 7 is a bottom view of such form.

Figure 8 is a view in section showing the manner of use of the form illustrated in Figs. 6 and 7 in the production of a bridge for the spectacles.

Figure 9 is a view similar to Fig. 1 but illustrating a step in uniting the bridge of the spectacles with the lens frames.

Figure 10 is a front view similar to Fig. 2 but illustrating the bridge joined to the lens frames.

Figure 11 is a side view of the structure as shown in Fig. 10.

It is generally recognized by the profession that spectacles and eye glasses should, at all times, be properly placed with respect to the eyes, not only to obtain the best results, but more materially to avoid injury to the eyes. The correct position for the spectacles and eye glasses is further generally recognized to be such that the center of the lenses shall be opposite the center of the eyes and this means that each lens shall be at the same distance from the eyes as its companion lens and that a horizontal plane passing centrally through both eyes shall also pass centrally horizontally through the lenses. That is, that the lenses shall not be tipped to one side or the other. When placed in this correct position the lenses should also be located in a plane at right angles to the horizontal plane passing centrally through the eyes both vertically and laterally with respect to the eyes.

This correct position of the spectacles is diagrammatically featured in the drawings herein, and especially in Figs. 1 to 3 in which the broken lines a— and b— represent planes passing vertically through the centers of both eyes and in the direction of depth thereof, these planes being parallel to each other and likewise parallel to a similar plane denoted by the broken line c— passing substantially through the center of the nose. A plane represented by the broken line d— passing horizontally centrally through the eyes at right angles to the planes a, b, and c determines the correct horizontal position of the lenses the centers of which should be in this plane. A plane denoted by the broken line e— determines the proper distance for location of the lenses in front of and from the eyes, this plane being located at right angles to the plane d thereby locating the lenses at right angles to such plane.

The foregoing description has reference to eyes of normal condition and concerning which the planes a—b pass centrally through the retina 12, body filling 13, crystalline lenses 14, iris 15 and pupil 16 dividing such parts into halves, and similarly the horizontal plane d passes horizontally through said members of the eyes dividing them into halves.

The correct position of the lenses just explained having been determined by methods well-known to those skilled in the art it becomes essential to so construct the frame for the lenses that the latter will always be located in the positions denoted in the drawing whenever said lenses are placed in position for vision, and my invention has to do principally with this feature. A notable and essential requirement is a bridge that will closely fit the nose 11 with its structure in repose, that is, without distortion of the flesh, skin or bone, as if these elements be distorted and out of position when the bridge is fitted, in order to thereafter correctly position the spectacles on the eyes, it will be necessary each time to distort the nose structure to the same extent as when the bridge was fitted, and this is a practical impossibility.

I have therefore demonstrated that the bridge may be fitted to the nose while the elements composing its structure are in repose. In carrying out my purpose I provide a flask 17 of a size to fit over the upper part of the nose 11, and as shown in Fig. 4 of the drawing. Any suitable material, as wax 18, that will become sufficiently rigid for the purpose is placed in the flask and the latter is then applied to the nose, thereby producing a mold in exact conformity to the shape of the nose, and as shown in Figs. 4 and 5. After the material 18 has hardened or stiffened sufficiently the mold thus produced is filled with any suitable material, as plaster of Paris, thereby producing a form or cast 19 of the exact shape of the nose in its natural condition of repose, and as shown in Figs. 6 and 7.

With this form in hand I now proceed to fit a bridge thereto by first placing a band 20 of wax or other material that may be readily disintegrated over the form 19 and as shown in Fig. 8, this band being of the precise shape and proportions of a metal band to be produced. The form 19 is placed in another flask 21 and mold substance 22 of any suitable material used in the preparation of molds is placed in the flask to completely cover the form 19 and the band 20, an opening 23 providing a gate being left, as by means of a pin placed with its end against the wax band and the mold material being then filled in around the pin, it being understood that the band of wax is placed on the form in the position to be occupied by the band of the spectacle frame when in use for vision purposes. After the material 22 has been packed into the mold and the pin removed the material, as wax, comprising the band 20 is removed in any suitable manner, as by the application of heat to melt the material composing the band, the melted material being caused to flow out through the gate 23. The mold is now ready for the making of the metal bridge which is accomplished as by introducing fused metal, as gold, through the gate 23 into the interior of the mold, and this may be accomplished as by pouring the fused metal into the gate, or by centrifugal force in a manner that will be readily understood by those skilled in the art.

This bridge 24 is now permanently secured to clips 25 comprising a part of the spectacle frame in any suitable manner and in approximately the proper position, in which operation it will be understood that the frames for the lenses are properly placed and securely held at the proper interpupillary distance apart and as determined by the prescription furnished by the oculist, the form or cast 19 again being made use of by locating it in a fixed position between the frames, and while the parts are so held the ends of the bridge being permanently secured to the frames in any suitable manner. It will now be readily understood that the lenses are properly positioned so that they will correctly fit the eyes in accordance with the oculist's prescription and thereafter it will be found that the bridge, by reason of its fit upon the nose in its natural condition, will always rest in the same positions with the necessary result that the lenses will always be properly located with respect to the eyes, and as illustrated in Figs. 1, 2, and 3 of the drawing.

While there has been described herein the use of wax as a material for obtaining the preliminary form of the nose, it will be understood that this form may be secured by the use of any ordinary material in common use to obtain such results, and it will further be understood that the bridge need not necessarily be produced by the casting process as the correct shape of the bridge may be obtained by other methods of causing the metal to conform to the shape of the mold.

I claim:

1. In the process of constructing spectacle frames, wherein the centers of lenses carried by the frames are in a plane coincident with a plane through the centers of both eyes, and wherein the lenses are spaced apart so that the centers thereof will be the same as the interpupillary distance between the eyes, the process consisting in producing a mold of the nose while in repose and undistorted, then conforming the bridge of the frame to the form of the mold and then securing the spectacle frame to said bridge.

2. In the process of constructing spectacle frames, wherein the centers of lenses carried by the frame are in a plane coincident with a plane through the centers of both eyes, and wherein the lenses are spaced apart so that the centers thereof will be the same as the interpupillary distance between the eyes, the process consisting in obtaining a mold of the nose while in repose and undistorted, producing a cast of the nose from said mold, then molding the bridge for the spectacle frame upon the cast and then securing the spectacle frames to said bridge.

3. The process for constructing spectacle frames that consists in obtaining a cast of the nose while in repose and undistorted, placing a band of disintegrating material of the same shape as the bridge of the spectacle frame on said cast, forming a mold over said cast and band, then removing the band, then filling the space occupied by the band with material to produce a bridge, and then securing said bridge thus produced to the spectacle frame.

4. The process for constructing spectacle frames that consists in obtaining a mold of the nose while in repose and undistorted, producing a cast of the nose from said mold, placing a band of disintegrating material of the same shape as the bridge of the spectacle frame on said cast, forming a mold over said cast and band, then melting the band and removing it from the mold, then introducing fused material into the mold, and then securing the bridge thus produced to the spectacle frames.

ARTHUR J. WOLFF.